United States Patent
Adachi et al.

(10) Patent No.: US 11,915,494 B2
(45) Date of Patent: Feb. 27, 2024

(54) RELATIVE POSITION DETERMINING APPARATUS, RELATIVE POSITION DETERMINING METHOD, AND NON-TRANSITORY COMPUTER READABLE RECORDING MEDIUM

(71) Applicant: Mitsubishi Electric Corporation, Tokyo (JP)

(72) Inventors: Yoshiaki Adachi, Tokyo (JP); Yuji Hamada, Tokyo (JP); Takayoshi Takehara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 177 days.

(21) Appl. No.: 17/605,233

(22) PCT Filed: Jun. 19, 2019

(86) PCT No.: PCT/JP2019/024281
§ 371 (c)(1),
(2) Date: Oct. 21, 2021

(87) PCT Pub. No.: WO2020/255296
PCT Pub. Date: Dec. 24, 2020

(65) Prior Publication Data
US 2022/0180645 A1 Jun. 9, 2022

(51) Int. Cl.
*G01C 21/30* (2006.01)
*G06V 20/56* (2022.01)
*G06V 10/74* (2022.01)

(52) U.S. Cl.
CPC ........... *G06V 20/588* (2022.01); *G01C 21/30* (2013.01); *G06V 10/74* (2022.01)

(58) Field of Classification Search
CPC ...... G06V 20/588; G06V 20/56; G06V 10/74; G01C 21/30; G01C 21/3602;
(Continued)

(56) References Cited

U.S. PATENT DOCUMENTS

2012/0029813 A1 2/2012 Tajima et al.
2017/0206787 A1 7/2017 Ando
(Continued)

FOREIGN PATENT DOCUMENTS

JP 2005257314 A * 9/2005
JP 2013-168016 A 8/2013
(Continued)

OTHER PUBLICATIONS

Office Action dated Feb. 10, 2023, in Chinese Patent Application No. 201980097361.3 with computer-generated English translation thereof, 19 pages.
(Continued)

*Primary Examiner* — Abby Y Lin
*Assistant Examiner* — Dylan M Katz
(74) *Attorney, Agent, or Firm* — XSENSUS LLP

(57) ABSTRACT

A relative position determining apparatus according to the present invention includes: a first trajectory information obtaining unit obtaining first trajectory information that is a set of first trajectory points indicating positions that a first moving object has passed; a second trajectory information obtaining unit obtaining second trajectory information that is a set of second trajectory points indicating positions that a second moving object has passed; a map information obtaining unit obtaining map information including lane shape information indicating a shape of each lane; a matching determining unit determining whether each of the first trajectory information and the second trajectory information matches the lane shape information; and a relative lane determining unit determining relative lanes of the first moving object and the second moving object, based on a result of the determination by the matching determining unit.

9 Claims, 14 Drawing Sheets

(58) Field of Classification Search
CPC ............ G01C 21/3819; G01C 21/3658; G05D 1/0212; G08G 1/167; G08G 1/161; G08G 1/0112; G08G 1/0145; G08G 1/09626; G08G 1/096716; G08G 1/096741; G08G 1/096775; G08G 1/164; G08G 1/166; B60W 2554/80; B60W 30/165; B60W 2552/10; B60W 2552/00; B60W 2554/4049; B60W 40/04; B62D 15/025
See application file for complete search history.

(56) References Cited

U.S. PATENT DOCUMENTS

| | | |
|---|---|---|
| 2018/0190125 A1 | 7/2018 | Hayee et al. |
| 2018/0267172 A1* | 9/2018 | Oh ..................... G05D 1/0278 |
| 2019/0031193 A1 | 1/2019 | Kojima |
| 2019/0120632 A1* | 4/2019 | Daikoku ............ G01C 21/3658 |

FOREIGN PATENT DOCUMENTS

| | | | |
|---|---|---|---|
| JP | 2017-91502 A | | 5/2017 |
| JP | 2017-126219 A | | 7/2017 |
| JP | 2017-146724 A | | 8/2017 |
| JP | 2017146724 A | * | 8/2017 |
| JP | 2017-182521 A | | 10/2017 |
| WO | 2010/143291 A1 | | 12/2010 |

OTHER PUBLICATIONS

International Search Report and Written Opinion dated Sep. 24, 2019, received for PCT Application PCT/JP2019/024281, Filed on Jun. 19, 2019, 7 pages including English Translation.
Notice of Reasons for Refusal dated Mar. 2, 2020, received for JP Application 2019-566846, 7 pages including English Translation.
1 Extended European Search Report dated May 24, 2022, in European Application No. 19934171.0.

* cited by examiner

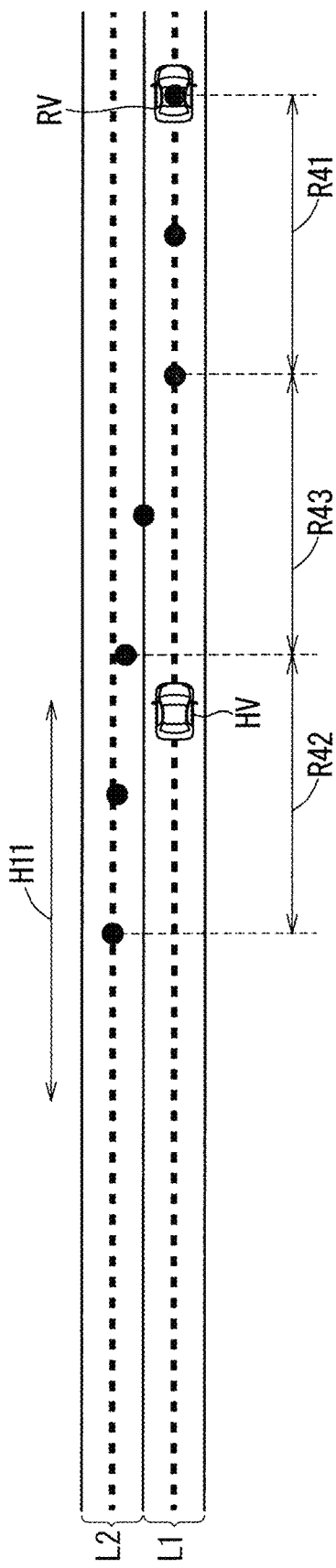

FIG. 12

| VARIOUS CONDITIONS || MATCHING CONDITIONS |||
|---|---|---|---|---|
| DIRECTION | DISTANCE | CONSECUTIVE POSITION MATCHING SECTIONS | CONSECUTIVE SHAPE MATCHING SECTIONS | NONCONSECUTIVE |
| SAME | LESS THAN 200 M | DETERMINING UNIT A | DETERMINING UNIT A DETERMINING UNIT B | DETERMINING UNIT B |
| SAME | 200 M OR LONGER | DETERMINING UNIT A | DETERMINING UNIT A | DETERMINING UNIT B |
| OPPOSITE | NONE | DETERMINING UNIT C | DETERMINING UNIT C | DETERMINING UNIT C |
| CROSS | NONE | DETERMINING UNIT D | DETERMINING UNIT D | DETERMINING UNIT D |
| ... | ... | ... | ... | ... |

RELATIVE POSITION DETERMINING APPARATUS, RELATIVE POSITION DETERMINING METHOD, AND NON-TRANSITORY COMPUTER READABLE RECORDING MEDIUM

CROSS-REFERENCE TO RELATED APPLICATION

The present application is based on PCT filing PCT/JP2019/024281, filed Jun. 19, 2019, the entire contents of which are incorporated herein by reference.

TECHNICAL FIELD

The present invention relates to, in a driving assistance system using communication, a relative position determining apparatus, a relative position determining method, and a non-transitory computer readable recording medium for determining relative positions of moving objects.

BACKGROUND ART

Driving assistance systems using communication provide driving assistance aiming at improving safety and comfort by exchanging position information between moving objects and determining relative positions of the moving objects. Here, the relative positions are information indicating a relative position relationship between two moving objects. Methods for determining relative positions include a method for determining relative positions by matching moving objects to map information based on position information of each of the moving objects. However, in the presence of an error in at least one of the position information of each of the moving objects and the map information, relative position information is mistakenly determined in such a determining method.

To address the problem, technologies for restricting driving assistance in the presence of an error in position information of a moving object have conventionally been disclosed (see, for example, Patent Document 1). Furthermore, technologies for correcting map information using time series of position information of a moving object in the presence of an error in the map information have been disclosed (see, for example, Patent Document 2).

PRIOR ART DOCUMENTS

Patent Documents

[Patent Document 1] Japanese Patent Application Laid-Open No. 2017-126219
[Patent Document 2] Japanese Patent Application Laid-Open No. 2017-146724

SUMMARY

Problem to be Solved by the Invention

Patent Documents 1 and 2 are predicated on the fact that the position information of each of the moving objects or the map information is clearly accurate. When whether the position information of each of the moving objects or the map information is accurate is unknown, Patent Documents 1 and 2 are not applicable. Specifically, when whether the position information of each of the moving objects or the map information is accurate is unknown, relative positions of the moving objects cannot be accurately determined according to Patent Documents 1 and 2.

The present invention has been conceived to solve such a problem, and has an object of providing a relative position determining apparatus, a relative position determining method, and a non-transitory computer readable recording medium which enable accurate determination of the relative positions of the moving objects even when whether the position information of each of the moving objects or the map information is accurate is unknown.

Means to Solve the Problem

To solve the problem, a relative position determining apparatus according to the present invention includes: a first trajectory information obtaining unit to obtain first trajectory information that is a set of first trajectory points indicating positions that a first moving object has passed; a second trajectory information obtaining unit to obtain second trajectory information that is a set of second trajectory points indicating positions that a second moving object has passed; a map information obtaining unit to obtain map information including lane shape information indicating a shape of each lane; a matching determining unit to determine whether each of the first trajectory information and the second trajectory information matches the lane shape information; and a relative lane determining unit to determine relative lanes of the first moving object and the second moving object, based on a result of the determination by the matching determining unit.

Effects of the Invention

Since the relative position determining apparatus according to the present invention includes: a matching determining unit to determine whether each of the first trajectory information and the second trajectory information matches the lane shape information; and a relative lane determining unit to determine relative lanes of the first moving object and the second moving object, based on a result of the determination by the matching determining unit, the relative position determining apparatus can accurately determine the relative positions of the moving objects even when whether the position information of each of the moving objects or the map information is accurate is unknown.

The object, features, aspects and advantages of the present invention will become more apparent from the following detailed description and the accompanying drawings.

BRIEF DESCRIPTION OF DRAWINGS

FIG. 11 illustrates an example operation of the relative position determining apparatus according to Embodiment 1 of the present invention.

FIG. 12 illustrates an example determining method selection table according to Embodiment 1 of the present invention.

DESCRIPTION OF EMBODIMENTS

Embodiments of the present invention will be hereinafter described based on the drawings.

Embodiment 1

[1-1. Configuration of Driving Assistance System]

Figure 1:
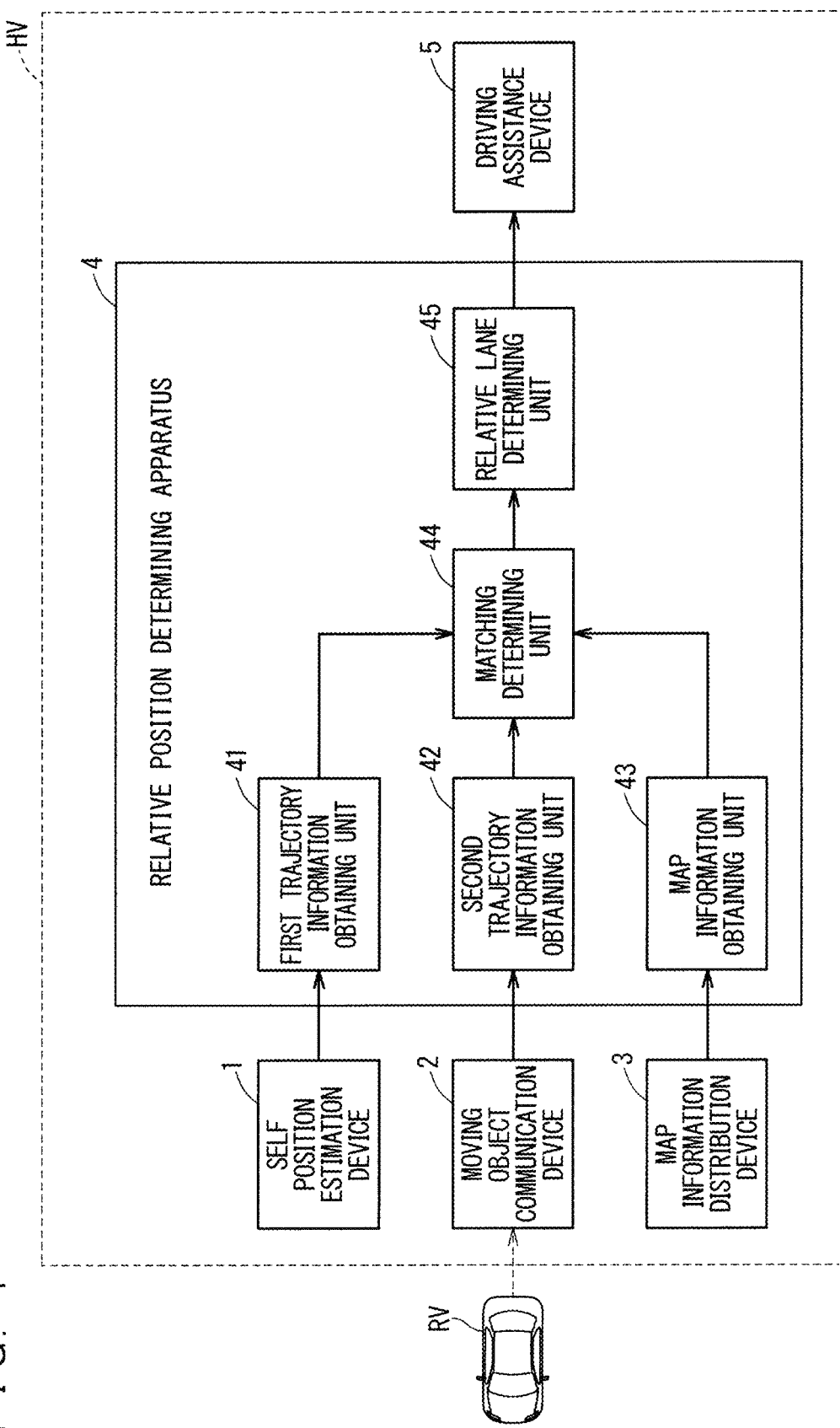
FIG. 1 is a block diagram illustrating an example configuration of a driving assistance system according to Embodiment 1 of the present invention.

FIG. 1 is a block diagram illustrating an example configuration of a driving assistance system according to Embodiment 1. The driving assistance system includes a subject moving object HV that is a first moving object that provides driving assistance to a driver, and a non-subject moving object RV that is a second moving object existing around the subject moving object HV. Here, the moving objects are transporters that move while traveling on roads. Examples of the moving objects include motor vehicles, motorbikes, bicycles, and personal transporters.

The subject moving object HV is a moving object that provides driving assistance to the driver. The subject moving object HV is equipped with: a self position estimation device 1 that estimates position information of the subject moving object HV; a moving object communication device 2 that receives position information of the non-subject moving object RV; a map information distribution device 3 that distributes map information; a relative position determining apparatus 4 that determines relative positions of the subject moving object HV and the non-subject moving object RV; and a driving assistance device 5 that provides driving assistance to the driver.

The non-subject moving object RV is a moving object that regularly transmits the position information of the non-subject moving object RV to the subject moving object HV. Although the non-subject moving object RV is equipped with at least a self position estimation device that estimates the position information of the non-subject moving object RV and a moving object communication device that transmits the position information of the non-subject moving object RV to the subject moving object HV, the non-subject moving object RV may have the same configuration as that of the subject moving object HV. The number of the non-subject moving objects RV may be one, or two or more.

The position information is information uniquely indicating a position that a moving object has passed or a current position of the moving object, and includes, for example, latitude and longitude. The position information may include, for example, time, altitude, azimuth in which the moving object travels, speed of the moving object, acceleration of the moving object, a yaw rate of the moving object, a pitch rate of the moving object, a roll rate of the moving object, a vehicle state of the moving object, and an amount of a positioning error. Furthermore, the position information is a measurement value obtained by positioning the moving object, or a value estimated from the measurement value, and information including a positioning error.

Trajectory information is information indicating time series of position information of a moving object, and is a set of trajectory points indicating positions that the moving object has passed. The trajectory information may include the entirety of the position information obtained through positioning, or a representative part of the position information.

The self position estimation device 1 is a positioning device that regularly generates the position information by estimating a real-time position of the moving object. The self position estimation device 1 may estimate a position using, for example, a Global Navigation Satellite System (GNSS) unit that performs satellite positioning. Besides the GNSS unit, the self position estimation device 1 may use, in combination, a vehicle speed sensor that detects the speed of the moving object, a wheel encoder that detects the number of times the wheels of the moving object have rotated, an inertial measurement unit (IMU) that detects the acceleration and the attitude of the moving object, and a laser range finder (LRF) that observes a feature around the moving object, and estimate a position through combined use of information obtained from these devices.

The moving object communication device 2 is a radio communication device that transmits position information to the non-subject moving object RV existing around the subject moving object HV, or receives position information from the non-subject moving object RV. The radio communication systems to be used by the moving object communication device 2 may be any communication systems enabling mobile communication, for example, narrow-area radio communications including Dedicated Short Range Communication (DSRC, trademark), wireless Local Area Network (LAN), and Bluetooth (trademark), wide-area radio communications including Long Term Evolution (LTE, trademark), World Interoperability For Microwave Access (WiMAX, trademark), IEEE802.11p studied in Europe and the United States for mobile communication, and Communication Access for Land Mobile (CALM).

The map information distribution device 3 is a device that stores map information and provides map information around the subject moving object HV based on the position information of the subject moving object HV. Example provision methods to be performed by the map information distribution device 3 may include the use of Advanced Driver Assistance System Interface Specification (ADASIS) that is a standard interface on provision of map information, and an original method.

The map information is road map information indicating shapes, attributes, and connections of roads on which the moving object travels, and is information including lane shape information indicating a shape of each lane. The lane shape information is information representing a shape of a lane at a sub-meter resolution, a centimeter resolution, or a resolution higher than these. Example representation forms of the lane shape may include the way the center of a lane is represented, the way a section between lanes is represented, the way a region of a lane is represented, or another way. The map information and the lane shape information include a survey error caused by a survey, a mapping error caused by mapping, and a deterioration error caused by secular changes.

The relative position determining apparatus 4 is an apparatus that determines relative positions of two moving objects, and an apparatus that characterizes Embodiment 1. The relative positions are information indicating a relative position relationship between two moving objects, and information including relative lanes of the two moving objects. The relative lanes are information indicating, with respect to a lane on which one of the two moving objects exists, on which lane the other moving object exists. For example, the relative position determining apparatus 4 determines the same lane when one of moving objects and the other moving object are on the same lane, determines the right lane when the other moving object exists on a lane to the right of the lane on which the one of moving objects exists, determines the left lane when the other moving object exists on a lane to the left of the lane on which the one of moving objects exists, determines two lanes right when the other moving object exists two lanes right from the lane on which the one of moving objects exists, and determines two lanes left when the other moving object exists two lanes left from the lane on which the one of moving objects exists.

The relative positions may include not only the relative lanes but also information on a position relationship between the two moving objects. For example, the relative positions may include a relative distance, a relative speed, or a relative direction of the two moving objects.

The relative position determining apparatus 4 is connected to the self position estimation device 1, the moving object communication device 2, the map information distribution device 3, and the driving assistance device 5 through a network. The network may be any as long as it allows communication of information, for example, Flex Control Area Network (FlexCAN), Ethernet (trademark), or another communication standard.

The driving assistance device 5 is a device that determines details of driving assistance based on the relative positions determined by the relative position determining apparatus 4, and provides the driving assistance to the driver of the subject moving object HV. When the driving assistance device 5 having, for example, a collision avoidance function determines that the subject moving object HV and the non-subject moving object RV may collide with each other based on the relative positions determined by the relative position determining apparatus 4, the driving assistance device 5 alerts the driver through the Human Machine Interface (HMI), or controls the brake, the accelerator, the transmission, or the engine of the subject moving object HV to avoid the collision with the non-subject moving object RV.

[1-2. Configuration of Relative Position Determining Apparatus 4]

Figure 2:
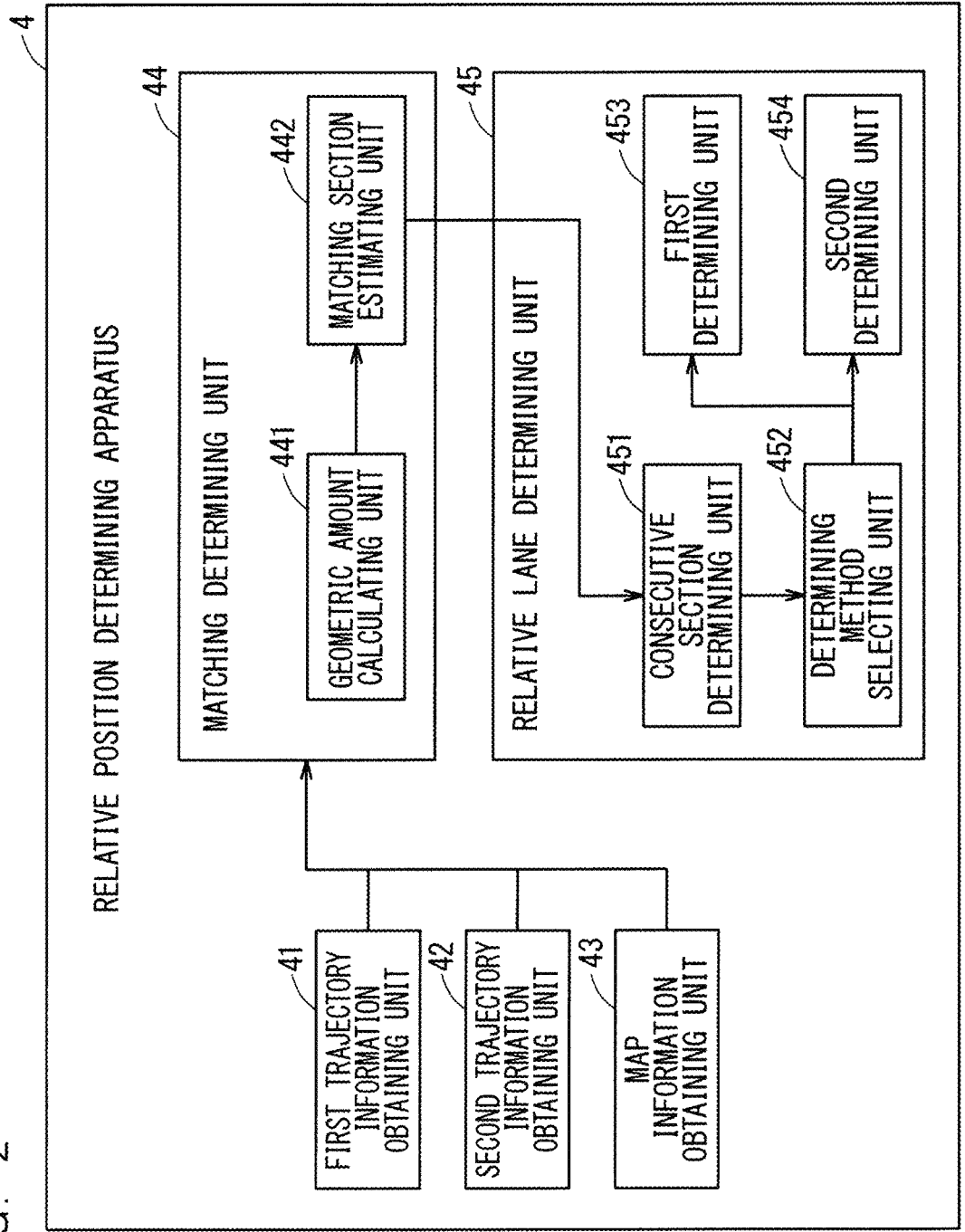
FIG. 2 is a block diagram illustrating an example configuration of a relative position determining apparatus according to Embodiment 1 of the present invention.

FIG. 2 is a block diagram illustrating an example configuration of the relative position determining apparatus 4.

The relative position determining apparatus 4 includes: a first trajectory information obtaining unit 41 that obtains first trajectory information that is trajectory information on the subject moving object HV that is the first moving object; a second trajectory information obtaining unit 42 that obtains second trajectory information that is trajectory information on the non-subject moving object RV that is the second moving object; a map information obtaining unit 43 that obtains map information including lane shape information indicating a shape of each lane; a matching determining unit 44 that determines whether each of the first trajectory information and the second trajectory information matches the lane shape information; and a relative lane determining unit 45 that determines relative lanes of the non-subject moving object RV and the subject moving object HV, based on a result of the determination by the matching determining unit 44.

The relative position determining apparatus 4 is a calculator including storage in which a program and a parameter for implementing each of the aforementioned functions are stored, a Central Processing Unit (CPU) that executes the program, a memory in which a result of the calculation by the CPU and the program executed by the CPU are temporarily held, and an interface that communicates with another device. FIG. 2 omits the illustration of these storage, CPU, memory, and interface.

The first trajectory information obtaining unit 41 obtains, from the self position estimation device 1, the first trajectory information that is the trajectory information on the subject moving object HV. Examples of a method for obtaining the first trajectory information by the first trajectory information obtaining unit 41 may include a method for accumulating the position information successively output by the self position estimation device 1 to generate the first trajectory information, and a method for obtaining a plurality of the position information accumulated by the self position estimation device 1 as the first trajectory information.

The second trajectory information obtaining unit 42 obtains, from the moving object communication device 2, the second trajectory information that is the trajectory information on the non-subject moving object RV. A method for obtaining the second trajectory information by the second trajectory information obtaining unit 42 may be the same as that for obtaining the first trajectory information by the first trajectory information obtaining unit 41.

The map information obtaining unit 43 obtains the map information from the map information distribution device 3. Examples of a method for obtaining the map information by the map information obtaining unit 43 may include a method for storing the map information successively output by the map information distribution device 3, and a method for requesting map information of a necessary region from the map information distribution device 3.

The matching determining unit 44 calculates a geometric differential amount between each first trajectory point included in the first trajectory information and the lane shape information included in the map information, estimates a matching section that is a section in which the first trajectory information and the lane shape information match, based on time series of the differential amounts, and generates first matching information including the matching section. The matching determining unit 44 also calculates a geometric differential amount between each second trajectory point included in the second trajectory information and the lane shape information included in the map information, estimates a matching section that is a section in which the second trajectory information and the lane shape information match, based on time series of the differential amounts, and generates second matching information including the matching section. The matching determining unit 44 includes a geometric amount calculating unit 441 that calculates a geometric differential amount, and a matching section estimating unit 442 that estimates a matching section based on a result of the calculation by the geometric amount calculating unit 441.

The matching section is information indicating a start point and an end point of the matching section. The matching section may be represented by, for example, arbitrary coordinates, trajectory points, a travel distance in the trajectory information, an identifier of a lane included in the map information and a travel distance, or another representation method.

The matching information may include matching types each indicating a type of a matching section, or another information. The matching types are information for the matching determining unit 44 and the relative lane determining unit 45 for identifying a type of a matching section. Examples of the matching types include "position matching section" when the trajectory information and the lane shape information match in position, "shape matching section" when the trajectory information and the lane shape information match in shape, and "analogous matching section" when the trajectory information and the lane shape information are different in position and shape but may expectedly match each other. The matching types may consist of these three types, or include another type. The following description is based on the three matching types.

The geometric amount calculating unit 441 calculates a geometric differential amount between each of the first trajectory points and the lane shape information. The geometric amount calculating unit 441 also calculates a geometric differential amount between each of the second trajectory points and the lane shape information. The geometric amount calculating unit 441 may calculate a differential amount between each of the trajectory points and the lane shape information, for example, by calculating, using the trajectory points and the lane shape information, a neighbor distance based on latitude and longitude, an azimuth difference based on azimuth, or an altitude difference based on altitude.

The matching section estimating unit 442 estimates a matching section in which the first trajectory information and the lane shape information match, based on the time series of the differential amounts on the first trajectory points that have been calculated by the geometric amount calculating unit 441 to generate the first matching information including the matching section. The matching section estimating unit 442 also estimates a matching section in which the second trajectory information and the lane shape information match, based on the time series of the differential amounts on the second trajectory points that have been calculated by the geometric amount calculating unit 441 to generate the second matching information including the matching section.

The matching section estimating unit 442 may estimate only a matching section in which the trajectory information and the lane shape information completely match. The matching section estimating unit 442 may estimate at least one matching section in which the trajectory information and the lane shape information partially match, or combine two or more of such matching sections and estimate the sections as one matching section. When the matching information includes a matching section, the matching section estimating unit 442 may associate, with the matching section, a matching type corresponding to a method for estimating a matching section.

Here, a method for estimating a matching section by the matching section estimating unit 442 will be described. The estimating method described below is a mere example but may be another estimating method.

First, the matching section estimating unit 442 estimates a position matching section. Examples of a method for estimating a position matching section may include estimating, as a position matching section, a section in which the number of consecutive trajectory points whose neighbor distance with the lane shape information falls within a preset threshold is a certain value or larger. The preset threshold may be, for example, a fixed value ranging from 1.0 to 2.0 m, or a value calculated from a lane width if included in the map information. The section in which the number of consecutive trajectory points is a certain value or larger may be, for example, a section including three consecutive trajectory points or more, or a section in which a travel distance between the trajectory points is 20 m or longer.

Next, the matching section estimating unit 442 estimates a shape matching section. Examples of a method for estimating a shape matching section may include estimating, as a shape matching section, a section in which the number of consecutive trajectory points which have been determined as not in the position matching section and whose variance of a neighbor distance with the lane shape information falls within a threshold is a certain value or larger. The preset threshold may be, for example, a standard deviation lower than or equal to 1.0 m, or a value calculated from a lane width if included in the map information.

Finally, the matching section estimating unit 442 estimates an analogous matching section. Examples of a method for estimating an analogous matching section may include estimating, as a position matching section, trajectory points which have been determined as not in the position matching section or the shape matching section and that are located within a certain distance in backward and forward direction, and estimating, as an analogous matching section, the section with a high probability of a lane change based on the trajectory information. For example, a fixed value ranging from 10 to 20 m, or a value calculated from a speed if included in the position information may be set as the certain distance in backward and forward direction.

The relative lane determining unit 45 selects a relative lane determining method to be executed from among a plurality of relative lane determining methods, by determining whether the subject moving object HV and the non-subject moving object RV correspond to the map information, based on a determination result of the matching on the subject moving object HV and a determination result of the matching on the non-subject moving object RV. Then, the relative lane determining unit 45 determines relative lanes of the non-subject moving object RV and the subject moving object HV in the selected relative lane determining method, and outputs the determination result as relative position information.

The relative lane determining unit 45 includes a first determining unit 453 and a second determining unit 454 that determine relative lanes of two moving objects, a consecutive section determining unit 451 that determines whether matching sections of the two moving objects are consecutive, and a determining method selecting unit 452 that selects a relative lane determining method to be executed from among a plurality of relative lane determining methods.

The first determining unit 453 determines relative lanes of the subject moving object HV and the non-subject moving object RV based on the map information. For example, the first determining unit 453 may map the current positions of the subject moving object HV and the non-subject moving object RV on a map, and determine relative lanes of the subject moving object HV and the non-subject moving object RV from the positon relationship of the lanes included in the map information. Furthermore, the first determining unit 453 may calculate a lateral distance between the lane shape information and the current position of the subject moving object HV and a lateral distance between the lane shape information and the current position of the non-subject moving object RV, based on a result of the mapping, and determine relative lanes of the subject moving object HV and the non-subject moving object RV based on a differential amount between these distances.

The second determining unit 454 determines relative lanes of the subject moving object HV and the non-subject moving object RV without using the map information. For example, the second determining unit 454 determines relative lanes of the subject moving object HV and the non-subject moving object RV based on the first trajectory information, the second trajectory information, and a preset threshold of a lane width, without using the map information.

The first determining unit 453 and the second determining unit 454 may perform not only the aforementioned relative lane determining methods, but also other relative lane determining methods that are different from each other. The relative lane determining unit 45 may further include another determining unit other than the first determining unit 453 and the second determining unit 454.

Although inclusion of separate determining units corresponding to the respective relative lane determining methods are described with reference to FIG. 2, the present disclosure is not limited to this. For example, a plurality of parameters may be switched in a single relative lane determining method. For example, when adjustment is made using parameters on weights of the relative lane determining method based on the map information and the relative lane determining method based on the trajectory information, the determining method may be changed by switching between the weights.

The consecutive section determining unit 451 determines whether a matching section to which the current position of the subject moving object HV belongs and a matching section to which the current position of the non-subject moving object RV belongs are consecutive, based on the first matching information on the subject moving object HV and the second matching information on the non-subject moving object RV. Being consecutive indicates a state where the two matching sections overlap one another, are adjacent to each other, or are in contact with each other through one or more matching sections that overlap or adjacent to the two matching sections.

The consecutive section determining unit 451 may determine that the matching sections are not consecutive or otherwise, in the absence of the matching section to which the current position of the subject moving object HV belongs or the matching section to which the current position of the non-subject moving object RV belongs. Even in the absence of the matching section to which the current position of the subject moving object HV belongs, the consecutive section determining unit 451 may determine, when a matching section consecutive to the matching section to which the current position of the non-subject moving object RV belongs includes the current position of the subject moving object HV, that the matching sections are consecutive. Furthermore, even in the absence of the matching section to which the current position of the non-subject moving object RV belongs, the consecutive section determining unit 451 may determine, when a matching section consecutive to the matching section to which the current position of the subject moving object HV belongs includes the current position of the non-subject moving object RV, that the matching sections are consecutive.

The determining method selecting unit 452 selects one of the first determining unit 453 and the second determining unit 454, based on a result of the determination by the consecutive section determining unit 451. For example, when the result of the determination by the consecutive section determining unit 451 is positive, that is, when the consecutive section determining unit 451 determines that the matching sections are consecutive, the determining method selecting unit 452 selects the first determining unit 453 because the map information, the first trajectory information, and the second trajectory information are accurate. When the result of the determination by the consecutive section determining unit 451 is negative, that is, when the consecutive section determining unit 451 determines that the matching sections are not consecutive, the determining method selecting unit 452 selects the second determining unit 454 because the map information is probably inaccurate.

The determining method selecting unit 452 may add conditions for selecting a relative lane determining method, other than the result of the determination by the consecutive section determining unit 451. For example, when the matching information includes a matching type, the determining method selecting unit 452 may select a relative lane determining method using the matching type. Here, when the matching type is position matching section, the determining method selecting unit 452 selects a relative lane determining method using absolute lanes in the map information because the absolute positions in the lane shape information and the map information are correct. Furthermore, when the matching type is shape matching section, the determining method selecting unit 452 selects a relative lane determining method using relative lanes in the map information because the relative positions in the lane shape information and the map information are correct. Furthermore, when the matching type is analogous matching section, the determining method selecting unit 452 may select a relative lane determining method similar to that of the position matching section as the matching type.

The determining method selecting unit 452 may select both of the first determining unit 453 and the second determining unit 454. Here, the determining method selecting unit 452 integrates results of the determination by the first determining unit 453 and the second determining unit 454.

[1-3. Operations of Matching Determining Unit 44]

Operations of the matching determining unit 44 will be described with reference to FIGS. 3 to 6.

FIGS. 3 to 6 illustrate four example operations of the matching determining unit 44. FIGS. 3 to 6 illustrate road lanes L1 and L2, a moving object V traveling on the road lane L1, lane shape information M1 on the road lane L1, lane shape information M2 on the road lane L2, and trajectory points P1 to P7 included in trajectory information of the moving object V. In the following description, the matching section estimating unit 442 determines the aforementioned three matching sections.

Figure 3:
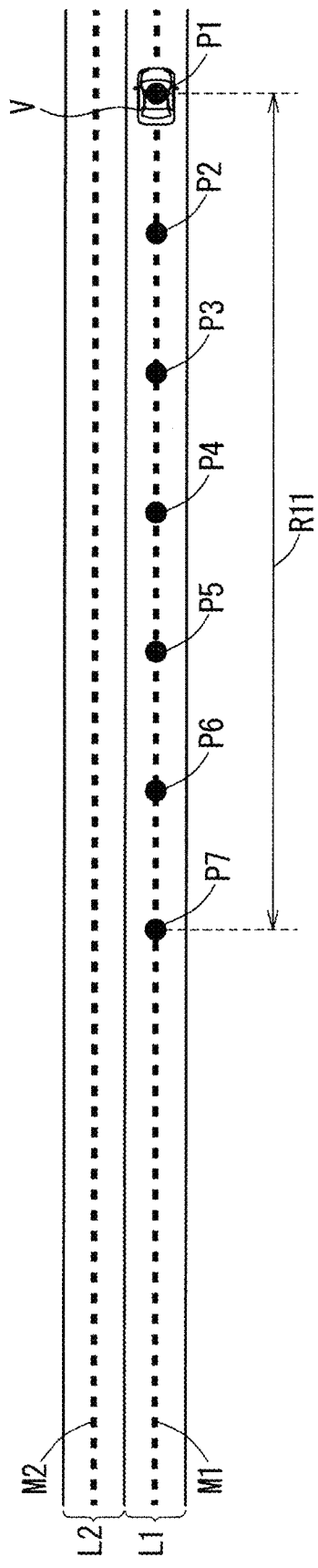
FIG. 3 illustrates an example operation of the relative position determining apparatus according to Embodiment 1 of the present invention.

FIG. 3 illustrates a case where the map information and the trajectory information are accurate. The matching section estimating unit 442 estimates a section R11 corresponding to the trajectory points P1 to P7 as a position matching section because the lane shape information M1 and each of the trajectory points P1 to P7 match in position. Then, the matching determining unit 44 generates the matching information including the matching section R11, and the position matching section as the matching type.

Figure 4:
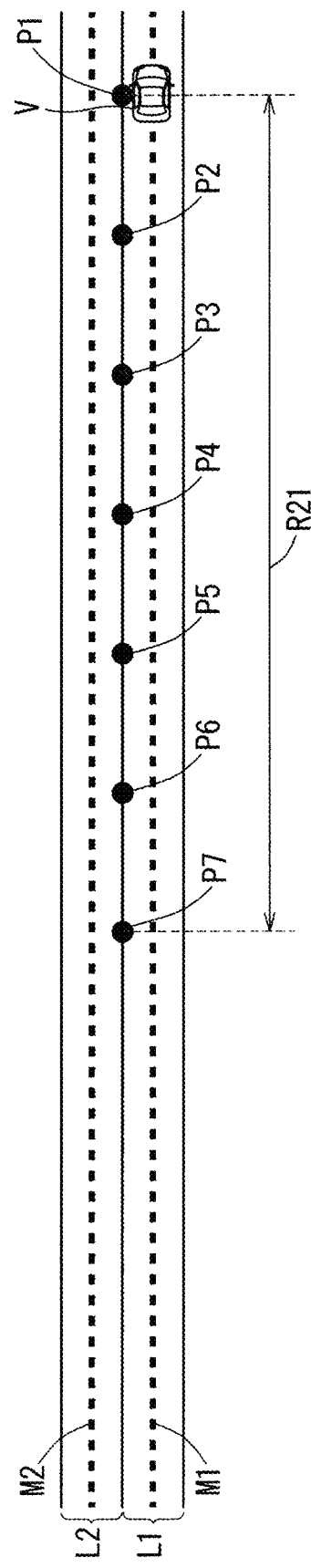
FIG. 4 illustrates an example operation of the relative position determining apparatus according to Embodiment 1 of the present invention.

FIG. 4 illustrates a case where the map information is accurate and the trajectory information has an error such as an offset. The matching section estimating unit 442 estimates a section R21 corresponding to the trajectory points P1 to P7 as a shape matching section because the lane shape information M1 or the lane shape information M2 and each of the trajectory points P1 to P7 match in shape. Then, the matching determining unit 44 generates the matching information including the matching section R21, and the shape matching section as the matching type.

Figure 5:
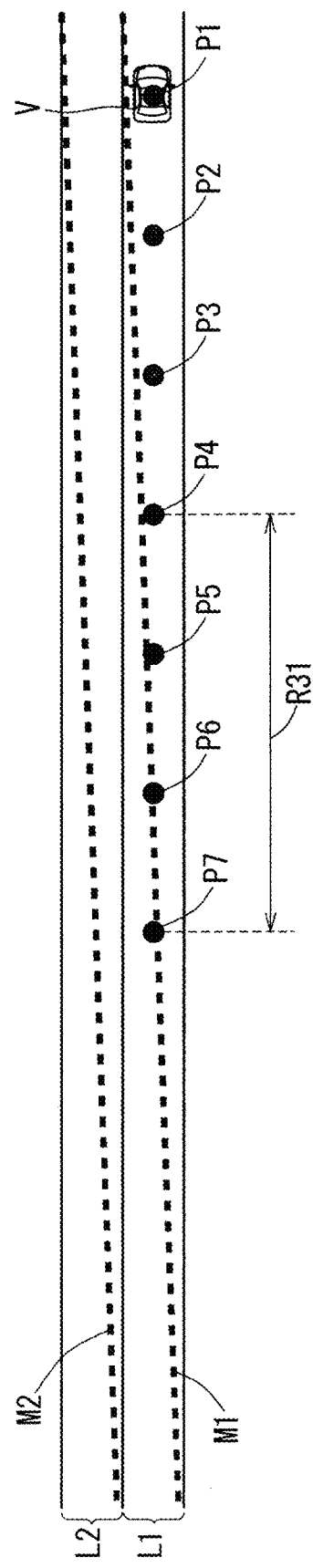
FIG. 5 illustrates an example operation of the relative position determining apparatus according to Embodiment 1 of the present invention.

FIG. 5 illustrates a case where the trajectory information is accurate and the lane shape information included in the map information has an error. The matching section estimating unit 442 estimates a section R31 corresponding to the trajectory points P4 to P7 as a position matching section because the lane shape information M1 and each of the trajectory points P4 to P7 match in position. Then, the matching determining unit 44 generates the matching information including the matching section R31, and the position matching section as the matching type.

Figure 6:
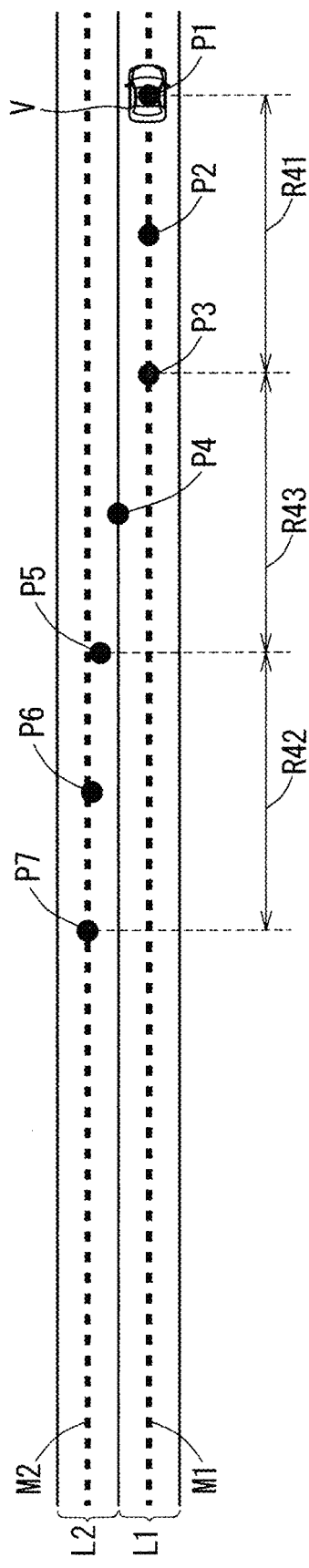
FIG. 6 illustrates an example operation of the relative position determining apparatus according to Embodiment 1 of the present invention.

FIG. 6 illustrates a case where the map information and the trajectory information are accurate and a moving object has changed the lane. The matching section estimating unit 442 estimates a section R41 corresponding to the trajectory points P1 to P3 as a position matching section and a section R42 corresponding to the trajectory points P5 to P7 as a position matching section, because the lane shape information M1 and each of the trajectory points P1 to P3 match in position and the lane shape information M2 and each of the trajectory points P5 to P7 match in position. Next, the matching section estimating unit 442 estimates a section R43 corresponding to the trajectory points P3 to P5 as an analogous matching section, because sections ahead and behind the trajectory points P3 to P5 are the position matching sections though each of the trajectory points P3 to P5 does not match the lane shape information M1 or M2. Finally, the matching determining unit 44 generates the matching information including the matching section R41 and the position matching section as the matching type, the matching section R42 and the position matching section as the matching type, and the matching section R43 and the analogous matching section as the matching type.

[1-4. Operations of Relative Lane Determining Unit 45]

Operations of the relative lane determining unit 45 will be described with reference to FIGS. 7 to 11.

FIGS. 7 to 11 illustrate five example operations of the relative lane determining unit 45. FIGS. 7 to 11 are obtained by adding, to FIGS. 3 to 6, the subject moving object HV traveling on the road lane L1 and a matching section H11 to which the current position of the subject moving object HV belongs. In FIGS. 7 to 11, the non-subject moving object RV replaces the moving object V in FIGS. 3 to 6. FIGS. 7 to 11 omit the illustration of the trajectory information of the subject moving object HV to simplify the drawings.

Figure 7:
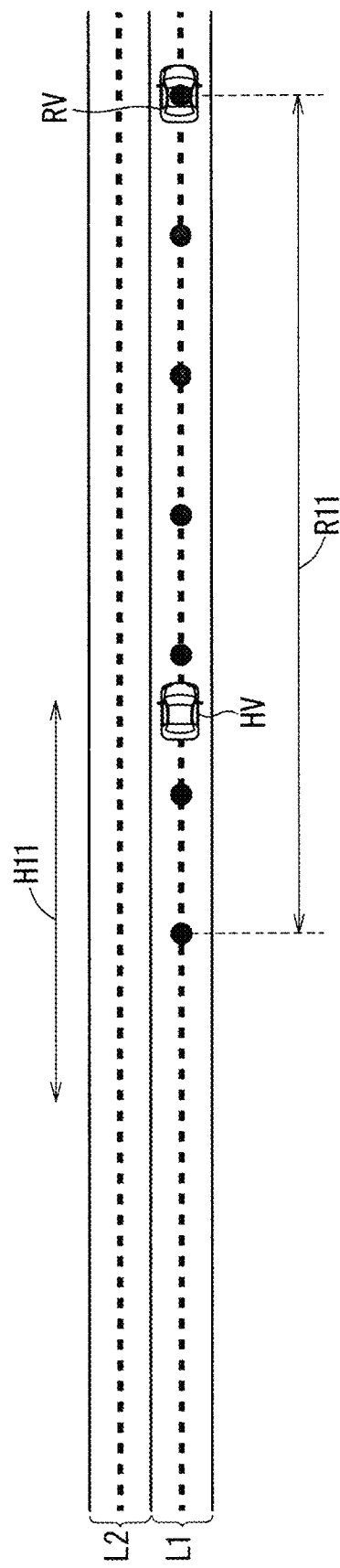
FIG. 7 illustrates an example operation of the relative position determining apparatus according to Embodiment 1 of the present invention.

FIG. 7 illustrates a case where the matching section H11 of the subject moving object HV overlaps the matching section R11 of the non-subject moving object RV. Since the matching section H11 to which the current position of the subject moving object HV belongs overlaps the matching section R11 to which the current position of the non-subject moving object RV belongs, the consecutive section determining unit 451 determines that these two matching sections are consecutive. Next, since a result of the determination by the consecutive section determining unit 451 is positive, that is, since the consecutive section determining unit 451 determines that the matching sections are consecutive, the determining method selecting unit 452 selects the relative lane determining method to be performed by the first determining unit 453. Finally, the first determining unit 453 determines a relative position relationship between the subject moving object HV and the non-subject moving object RV, and outputs the determination result as the relative position information.

Figure 8:
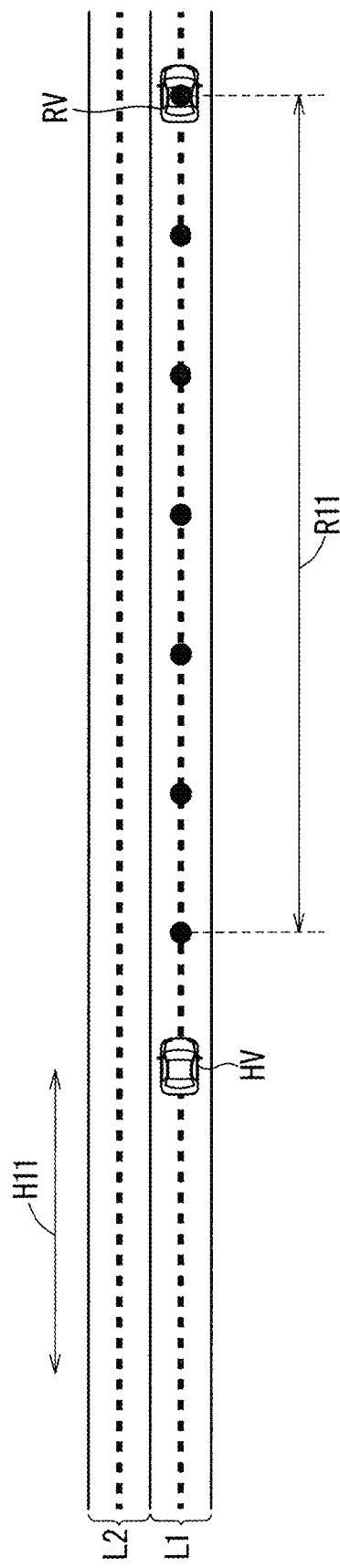
FIG. 8 illustrates an example operation of the relative position determining apparatus according to Embodiment 1 of the present invention.

FIG. 8 illustrates a case where the matching section H11 of the subject moving object HV does not overlap the matching section R11 of the non-subject moving object RV. Since the matching section H11 to which the current position of the subject moving object HV belongs neither overlaps nor is adjacent to the matching section R11 to which the current position of the non-subject moving object RV belongs, the consecutive section determining unit 451 determines that these two matching sections are not consecutive. Next, since a result of the determination by the consecutive section determining unit 451 is negative, that is, since the consecutive section determining unit 451 determines that the matching sections are not consecutive, the determining method selecting unit 452 selects the relative lane determining method to be performed by the second determining unit 454. Finally, the second determining unit 454 determines a relative position relationship between the subject moving object HV and the non-subject moving object RV, and outputs the determination result as the relative position information.

Figure 9:
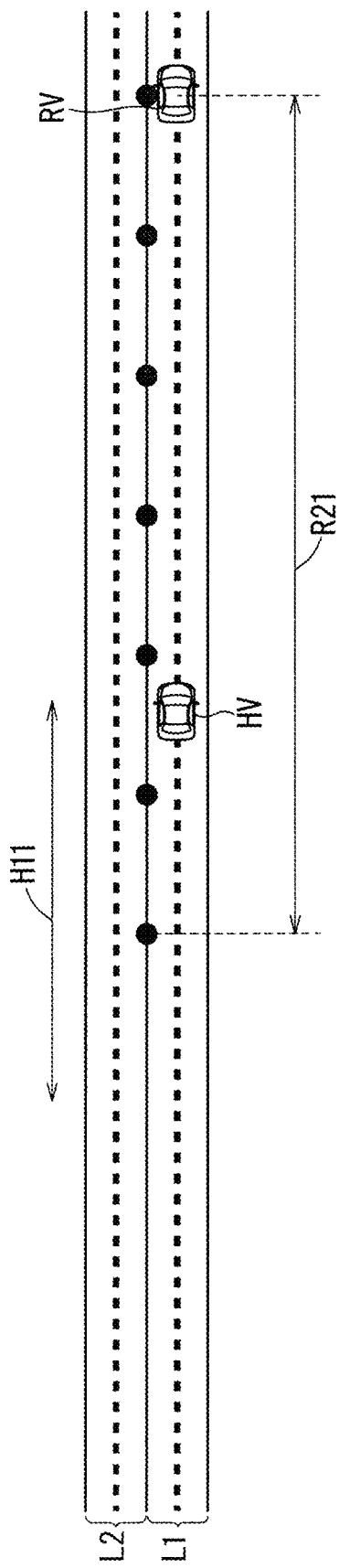
FIG. 9 illustrates an example operation of the relative position determining apparatus according to Embodiment 1 of the present invention.

FIG. 9 illustrates a case where the matching section H11 of the subject moving object HV overlaps the matching section R21 of the non-subject moving object RV. Since the matching section H11 to which the current position of the subject moving object HV belongs overlap the matching section R21 to which the current position of the non-subject moving object RV belongs, the consecutive section determining unit 451 determines that these two matching sections are consecutive. Next, since a result of the determination by the consecutive section determining unit 451 is positive, that is, since the consecutive section determining unit 451 determines that the matching sections are consecutive, the determining method selecting unit 452 selects the relative lane determining method to be performed by the first determining unit 453. Finally, the first determining unit 453 determines a relative position relationship between the subject moving object HV and the non-subject moving object RV, and outputs the determination result as the relative position information.

Figure 10:
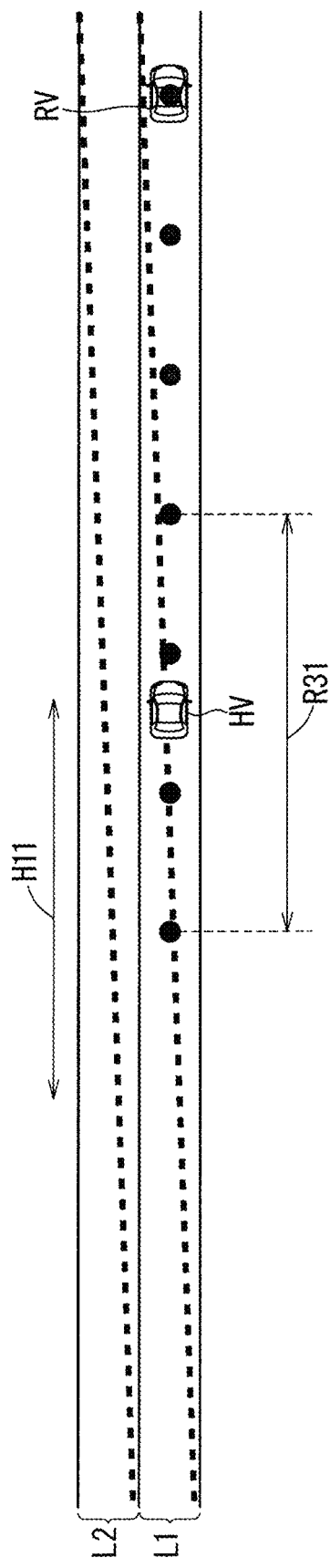
FIG. 10 illustrates an example operation of the relative position determining apparatus according to Embodiment 1 of the present invention.

FIG. 10 illustrates a case where the matching section H11 of the subject moving object HV overlaps the matching section R31 of the non-subject moving object RV. Since there is no matching section to which the current position of the non-subject moving object RV belongs, the consecutive section determining unit 451 determines that these two matching sections are not consecutive. Next, since a result of the determination by the consecutive section determining unit 451 is negative, that is, since the consecutive section determining unit 451 determines that the matching sections are not consecutive, the determining method selecting unit 452 selects the relative lane determining method to be performed by the second determining unit 454. Finally, the second determining unit 454 determines a relative position relationship between the subject moving object HV and the non-subject moving object RV, and outputs the determination result as the relative position information.

FIG. 11 illustrates a case where the subject moving object HV is in the matching section R42. First, the consecutive section determining unit 451 determines that the matching section H11 to which the current position of the subject moving object HV belongs overlaps the matching section R42 to which the current position of the non-subject moving object RV belongs. Next, the consecutive section determining unit 451 determines that the matching section R42 is adjacent to the matching section R43 and the matching section R43 is adjacent to the matching section R41. Finally, the consecutive section determining unit 451 determines that the matching section H11 to which the current position of the subject moving object HV belongs and the matching section R41 to which the current position of the non-subject moving object RV belongs are consecutive through the matching sections R42 and R43. Next, since a result of the determination by the consecutive section determining unit 451 is positive, that is, since the consecutive section determining unit 451 determines that the matching sections are consecutive, the determining method selecting unit 452 selects the relative lane determining method to be performed by the first determining unit 453. Finally, the first determining unit 453 determines a relative position relationship between the subject moving object HV and the non-subject moving object RV, and outputs the determination result as the relative position information.

The relative lane determining unit 45 may include a determining method selection table for selecting a determining unit corresponding to a relative lane determining method to be executed from among a plurality of relative lane determining methods, select a determining unit based on the determining method selection table, and determine relative lanes of the subject moving object HV and the non-subject moving object RV.

The determining method selection table is a table indicating conditions for the relative lane determining unit 45 to determine a determining unit to be executed from among a plurality of determining units. The table includes matching conditions indicating whether matching sections of the subject moving object HV and the non-subject moving object RV are consecutive, various conditions related to the subject moving object HV and the non-subject moving object RV other than the matching conditions, and determining units uniquely selected base on the matching conditions and the various conditions.

The matching conditions in the determining method selection table may include the matching types or determination results other than the positive and negative results output by the consecutive section determining unit 451. The various conditions in the determining method selection table are conditions for determining which relative lane determining method is used from among a plurality of relative lane determining methods. Examples of the various conditions may include relative moving directions, distances, and speeds that are estimated from the latest trajectory points of the subject moving object HV and the non-subject moving object RV. Alternatively, a new indicator may be calculated using the map information or the trajectory information.

FIG. 12 illustrates an example of the determining method selection table. The matching conditions are indicated in columns, and relative moving directions and relative distances of the subject moving object HV and the non-subject moving object RV are indicated as the various conditions in rows in FIG. 12. It is assumed in the example of FIG. 12 that determining units A to D execute different relative lane determining methods.

Suppose that, for example, a distance between the subject moving object HV and the non-subject moving object RV is 100 m in a state illustrated in FIG. 7. Here, since "consecutive position matching sections" hold as a matching condition and the "same" direction and a distance "less than 200 m" hold as the various conditions, "determining unit A" is selected.

Suppose that, for example, a distance between the subject moving object HV and the non-subject moving object RV is 150 m in a state illustrated in FIG. 8. Here, since "nonconsecutive" matching sections hold as a matching condition and the "same" direction and a distance "less than 200 m" hold as the various conditions, "determining unit B" is selected.

[1-5. Operations of Driving Assistance System]

Figure 13:
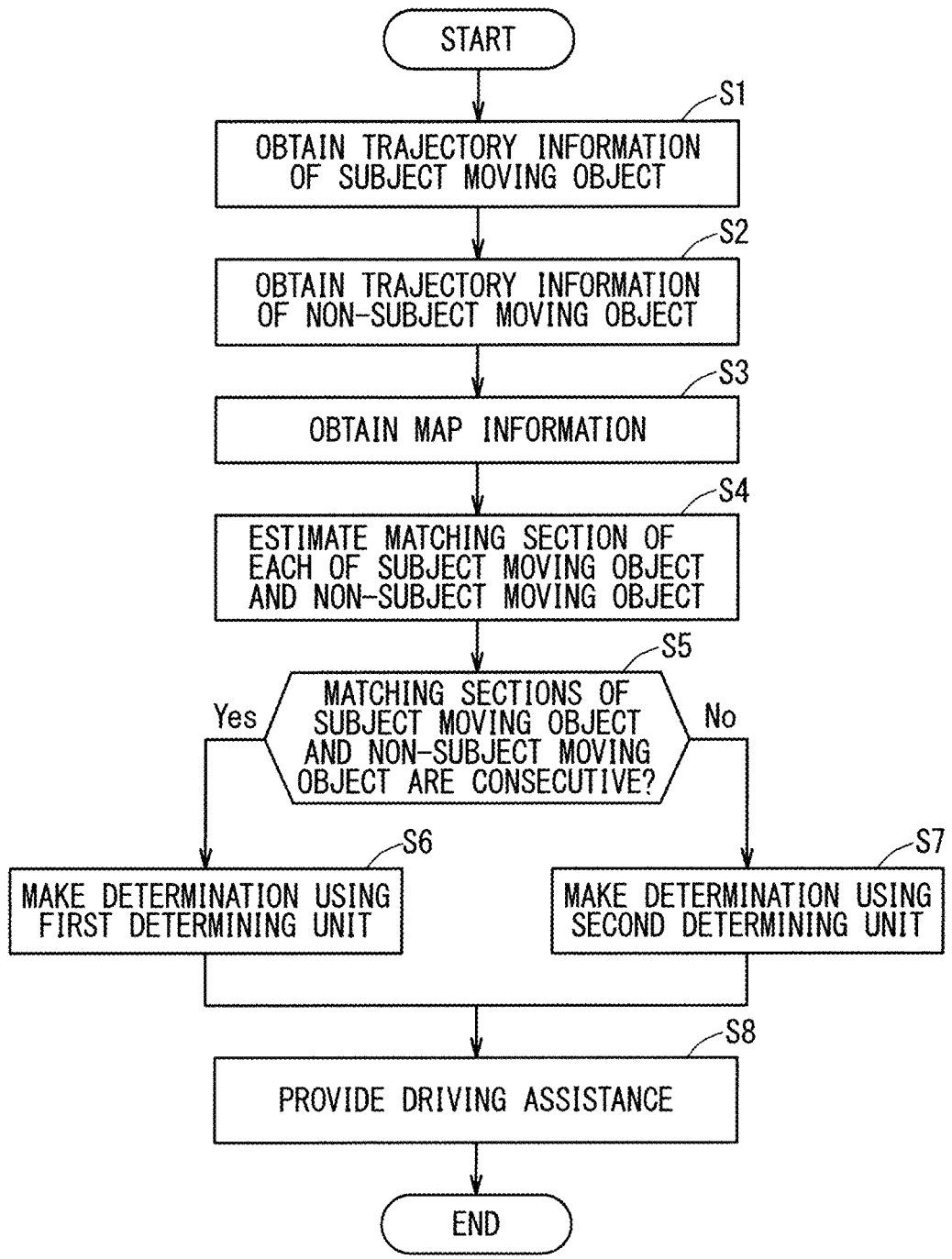
FIG. 13 is a flowchart illustrating an example of operations of the driving assistance system according to Embodiment 1 of the present invention.

FIG. 13 is a flowchart illustrating operations of the driving assistance system.

In Step S1, the self position estimation device 1 generates the position information of the subject moving object HV, and provides the position information to the first trajectory information obtaining unit 41. The first trajectory information obtaining unit 41 generates the first trajectory information by holding time series of the position information of the subject moving object HV. In other words, the first trajectory information obtaining unit 41 obtains the first trajectory information.

In Step S2, the moving object communication device 2 obtains the position information from the non-subject moving object RV, and provides the position information to the second trajectory information obtaining unit 42. The second trajectory information obtaining unit 42 generates the second trajectory information by holding time series of the position information of the non-subject moving object RV. In other words, the second trajectory information obtaining unit 42 obtains the second trajectory information.

In Step S3, the map information distribution device 3 retrieves the map information around the subject moving object HV, and provides the map information to the map information obtaining unit 43. The map information obtaining unit 43 obtains the map information from the map information distribution device 3 to hold the map information.

In Step S4, the matching determining unit 44 estimates a matching section in which the map information obtained by the map information obtaining unit 43 and each of the first trajectory information obtained by the first trajectory information obtaining unit 41 and the second trajectory information obtained by the second trajectory information obtaining unit 42 match, and provides the estimation result to the relative lane determining unit 45.

In Step S5, the relative lane determining unit 45 determines whether a matching section to which the current position of the subject moving object HV belongs and a matching section to which the current position of the non-subject moving object RV belongs are consecutive. When the matching sections are consecutive, the process proceeds to Step S6. When the matching sections are not consecutive, the process proceeds to Step S7.

In Step S6, the relative lane determining unit 45 determines relative lanes of the non-subject moving object RV and the subject moving object HV using the first determining unit 453, and generates the determination result as the relative position information.

In Step S7, the relative lane determining unit 45 determines relative lanes of the non-subject moving object RV and the subject moving object HV using the second determining unit 454, and generates the determination result as the relative position information.

In Step S8, the driving assistance device 5 determines details of driving assistance based on the relative position information provided from the relative position determining apparatus 4, and provides the driving assistance to the subject moving object HV.

Steps S1, S2, and S3 in FIG. 13 may be switched in order, and executed. Alternatively, Steps S1, S2, and S3 may be executed simultaneously.

[1-6. Advantages]

According to Embodiment 1, the matching determining unit 44 estimates a matching section in which the trajectory information of a moving object and the lane shape information match. The relative lane determining unit 45 determines whether the map information and the trajectory information are accurate by determining whether the matching sections to which the current positions of the two moving objects belong are consecutive, and selects a relative lane determining method corresponding to the determination result. Consequently, the relative position determining apparatus 4 can determine the relative positions of the two moving objects accurately more than the conventional devices, even when whether the position information of each of the moving objects and the map information are accurate is unknown.

Since the driving assistance device 5 provides driving assistance using the accurate relative position information obtained from the relative position determining apparatus 4, provision of wrong driving assistance caused by an error in the position information of each of the moving objects or the map information or situations where necessary driving assistance cannot be provided can be reduced.

The matching determining unit 44 associates a matching type to a matching section, and the relative lane determining unit 45 selects a relative lane determining method according to the matching type. Since the relative position determining apparatus 4 can distinguish how the map information and the trajectory information match, depending on cases, and select a relative lane determining method corresponding to each of the cases, the relative position determining apparatus 4 can determine the relative positions of the two moving objects accurately more than the conventional devices.

The relative lane determining unit 45 selects a determining unit to be executed from among a plurality of determining units. Since the relative position determining apparatus 4 need not determine an unnecessary relative lane, the processing load can be reduced.

The relative lane determining unit 45 selects a determining unit to be executed from among a plurality of determining units, using a determining method selection table. Consequently, the relative lane determining unit 45 can flexibly select a determining unit in consideration of, for example, a traveling state of each moving object and a relative relationship between two moving objects.

Embodiment 2

[2-1. Configuration of Driving Assistance System]

Embodiment 1 describes a case where the relative position determining apparatus 4 is mounted on the subject moving object HV. Embodiment 2 is characterized by mounting a relative position determining apparatus on a server device.

Figure 14:
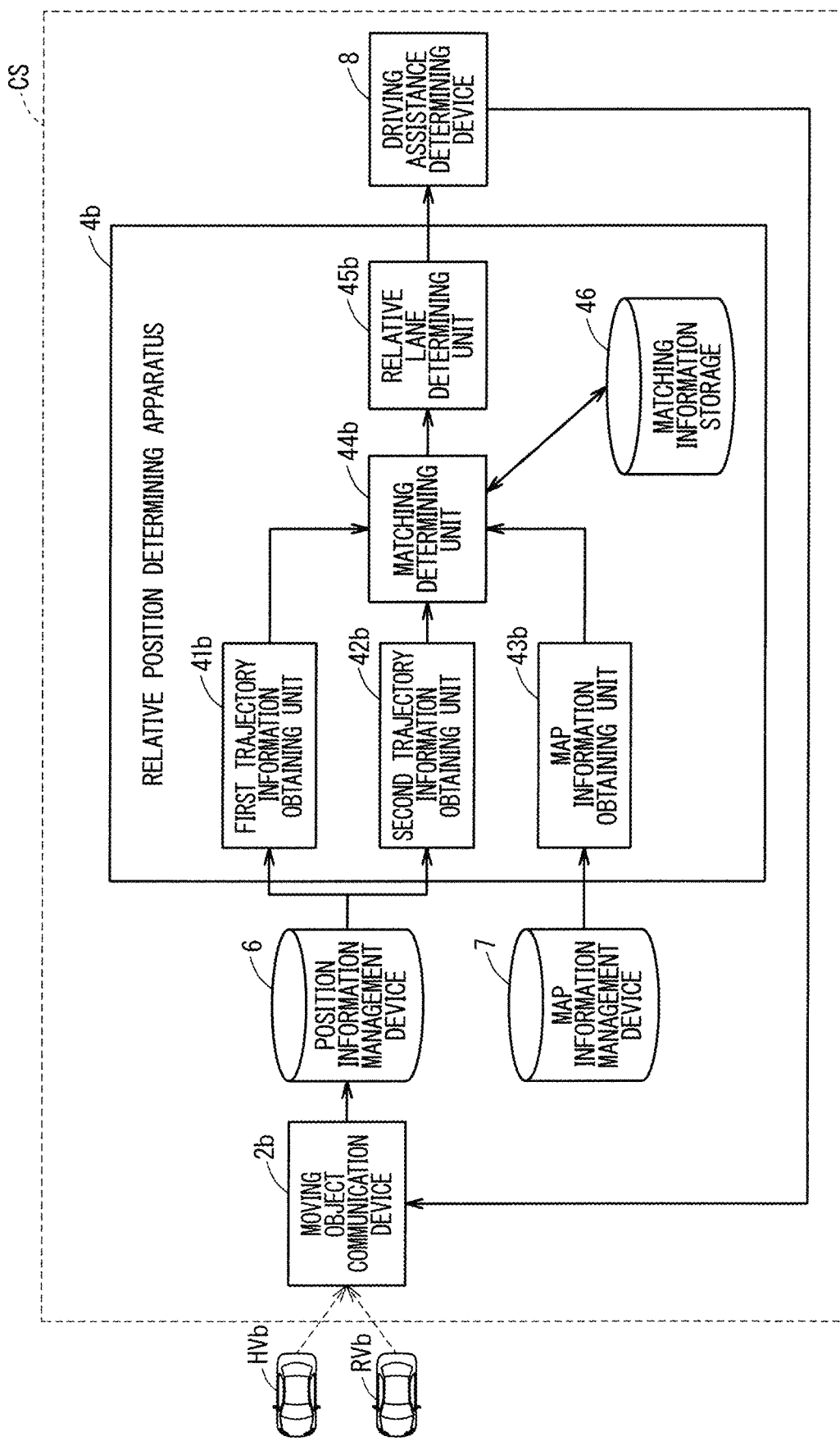
FIG. 14 is a block diagram illustrating an example configuration of a driving assistance system according to Embodiment 2 of the present invention.

FIG. 14 is a block diagram illustrating an example configuration of a driving assistance system according to Embodiment 2.

As illustrated in FIG. 14, the driving assistance system includes a moving object HVb that is a first moving object that provides driving assistance to the driver, a moving object RVb that is a second moving object around the moving object HVb, and a server device CS that determines a position relationship between the two moving objects and determines driving assistance based on a result of the determination.

The moving objects HVb and RVb are moving objects that move while traveling on roads, and may have the same configuration as that of, for example, the subject moving object HV or the non-subject moving object RV in Embodiment 1. Furthermore, the moving objects HVb and RVb regularly transmit the position information to the server device CS. Furthermore, the moving object HVb receives, from the server device CS, details of driving assistance determined by the server device CS, and provides the driving assistance to the driver according to the details. The number of the moving objects HVb and RVb may be two or more.

The server device CS includes: a moving object communication device 2b that communicates information with the moving objects HVb and RVb; a relative position determining apparatus 4b that determines relative positions of the two moving objects; a driving assistance determining device 8 that determines details of driving assistance; a position information management device 6 that holds and manages the position information of each of the moving objects HVb and RVb; and a map information management device 7 that holds and manages the map information.

The server device CS receives the position information transmitted from each of the moving objects HVb and RVb, determines relative positions of the moving objects HVb and RVb, and determines details of driving assistance to be provided to the driver of the moving object HVb, based on a result of the determination. The server device CS is similar to the calculator described in Embodiment 1. Examples of the server device CS may include a cloud server on the Internet, a multi-access edge computing (MEC) server on a core network such as a mobile network, and a roadside processing device installed on a roadside of a road.

The moving object communication device 2b communicates information with the moving objects HVb and RVb to receive the position information from each of the moving objects HVb and RVb, and notifies the moving object HVb of the details of driving assistance. The communication method to be performed by the moving object communication device 2b may be, for example, the one performed by the moving object communication device 2 described in Embodiment 1.

The relative position determining apparatus 4b is a device that determines relative positions of two moving objects.

The driving assistance determining device 8 determines a moving object to which driving assistance is provided, and details of the driving assistance to be provided to the driver, based on the relative position information determined by the relative position determining apparatus 4b. The method for determining the details of the driving assistance by the driving assistance determining device 8 may be, for example, the one performed by the driving assistance device 5 described in Embodiment 1.

The position information management device 6 is a database in which the position information on the moving object received by the moving object communication device 2b is held and which provides the relative position determining apparatus 4b with the trajectory information that is time series of the position information.

The map information management device 7 is a database that provides the relative position determining apparatus 4b with the map information to be used for determining a relative position relationship between two moving objects.

The position information management device 6 and the map information management device 7 may be installed in, for example, the server device CS and embodied as storage that stores information of each of the devices, or placed outside the server device CS and embodied as another server device connected through a network.

[2-2. Configuration of Relative Position Determining Apparatus 4b]

The relative position determining apparatus 4b includes: a first trajectory information obtaining unit 41b that obtains first trajectory information that is trajectory information on the moving object HVb that is the first moving object; a second trajectory information obtaining unit 42b that obtains second trajectory information that is trajectory information on the moving object RVb that is the second moving object; a map information obtaining unit 43b that obtains the map information including the lane shape information indicating a shape of each lane; a matching determining unit 44b that determines whether each of the first trajectory information and the second trajectory information matches the lane shape information; and a relative lane determining unit 45b that determines relative lanes of the moving objects HVb and RVb based on a result of the determination by the matching determining unit 44b. The relative position determining apparatus 4b further includes a matching information storage 46 in which the matching information generated by the matching determining unit 44b is stored.

The first trajectory information obtaining unit 41b obtains, from the position information management device 6, the first trajectory information that is the trajectory information on the moving object HVb. A method for obtaining the first trajectory information by the first trajectory information obtaining unit 41b may be the same as, for example, that for obtaining the first trajectory information by the first trajectory information obtaining unit 41 which is described in Embodiment 1. The first trajectory information obtaining unit 41b may operate with the timing of obtaining the position information by the moving object communication device 2b from the moving object HVb.

The second trajectory information obtaining unit 42b obtains, from the position information management device 6, the second trajectory information that is the trajectory information on the moving object RVb. A method for obtaining the second trajectory information by the second trajectory information obtaining unit 42b may be the same as, for example, that for obtaining the second trajectory information by the second trajectory information obtaining unit 42 which is described in Embodiment 1. The second trajectory information obtaining unit 42b may retrieve, as the second moving object, a moving object located within a certain range with respect to the position of the moving object HVb based on the position information of the first trajectory information obtaining unit 41b, and obtain the trajectory information of the second moving object.

The map information obtaining unit 43b obtains the map information around the moving objects HVb and RVb from the map information management device 7. A method for obtaining the map information by the map information obtaining unit 43b may be, for example, obtaining the map information within a certain range with respect to the position of the moving object HVb, or the same as that for obtaining the map information by the map information obtaining unit 43 which is described in Embodiment 1.

The matching determining unit 44b determines a matching section in which the map information and the trajectory information match, and generates the determination result as the matching information. The processes performed by the matching determining unit 44b may be the same as those of the matching determining unit 44 described in Embodiment 1.

The relative lane determining unit 45b determines the relative lanes of two moving objects based on the matching information of each of the two moving objects. The processes performed by the relative lane determining unit 45b may be the same as those of the relative lane determining unit 45 described in Embodiment 1.

The matching information storage 46 is a database in which at least one piece of matching information that is a result of determination by the matching determining unit 44b is stored.

The matching determining unit 44b determines whether a section in the map information is accurate, based on the past matching information stored in the matching information storage 46, and estimates, as a mismatch section, a section in which the map information is accurate but the trajectory information and the lane shape information do not match. Then, the matching determining unit 44b outputs mismatch information when estimating the section as a mismatch section.

The determining method performed by the matching determining unit 44b includes, for example, first retrieving matching information around a moving object that is a determination target, from the matching information storage 46 based on the position information of the moving object. Next, the matching determining unit 44b determines, based on the retrieved matching information, that a section in the map information which has been determined as a matching section a plurality of times (e.g., more than three times) is accurate. Next, the matching determining unit 44b determines whether the lane shape information and the trajectory information match. When the lane shape information and the trajectory information do not match in the section in which the map information is accurate, the matching determining unit 44b determines that the trajectory information in the section has an error, and outputs the result as mismatch information.

The mismatch information is information including a mismatch section indicating a section in which the lane shape information and the trajectory information do not match. The mismatch section is information indicating a section in which the lane shape information and the trajectory information do not match in a section in which the map information is accurate, and is information including a start point and an end point of the mismatch section. The representation methods of the mismatch section may be, for example, those on the matching section described in Embodiment 1.

The relative lane determining unit 45b may determine relative lanes of two moving objects by correcting the trajectory information of the moving objects included in the mismatch section, using the lane shape information based on the mismatch information. Examples of the correction method performed by the relative lane determining unit 45b may include matching the trajectory information with the lane shape information through translating the trajectory information when the entirety of the trajectory information is included in a mismatch section, and replacing the trajectory information in the mismatch section with the lane shape information when a part of the trajectory information is included in the mismatch section.

The matching determining unit 44b may perform matching again on the trajectory information corrected by the relative lane determining unit 45b, and the consecutive section determining unit 451 may use the corrected section as a matching section for determining whether sections are consecutive.

[2-3. Advantages]

The past matching information is stored in the matching information storage 46 according to Embodiment 2. The matching determining unit 44b determines whether a section in the map information is accurate, based on the past matching information. When the map information is accurate but the trajectory information and the lane shape information do not match in the section, the matching determining unit 44b determines that the trajectory information has an error. When the matching determining unit 44b determines that the trajectory information has an error, the relative lane determining unit 45b corrects the trajectory information using the map information. Since the relative position determining apparatus 4b detects an error in the trajectory information and corrects the error, the relative position determining apparatus 4b can determine correct relative positions.

The constituent elements of each of the relative position determining apparatus 4 described in Embodiment 1 and the relative position determining apparatus 4b described in Embodiment 2 may be implemented as calculation processes of the relative position determining method, and relative positions may be estimated by performing the calculation processes.

The constituent elements of each of the relative position determining apparatus 4 described in Embodiment 1 and the relative position determining apparatus 4b described in Embodiment 2 may be represented by a program to be executed by a calculator, and implemented by causing the calculator (a computer) to execute the program.

The configuration of each of the devices in FIGS. 1 and 14 may be changed without departing from the spirit and scope of the DESCRIPTION. For example, the devices may be integrated into one device, the devices may be divided into a plurality of devices, or the constituent elements of each of the relative position determining apparatus 4 and the relative position determining apparatus 4b may be dispersively allocated to another device.

Embodiments of the present invention can be free combined, and appropriately modified and omitted within the scope of the invention.

While the present invention is described in detail above, the foregoing description is in all aspects illustrative and does not restrict the invention. It is understood that numerous modifications that have not yet been exemplified can be devised without departing from the scope of the invention.

EXPLANATION OF REFERENCE SIGNS 1 self position estimation device, 2, 2b moving object communication device, 3 map information distribution device, 4 relative position determining apparatus, 5 driving assistance device, 6 position information management device, 7 map information management device, 8 driving assistance determining device, 41, 41b first trajectory information obtaining unit, 42, 42b second trajectory information obtaining unit, 43, 43b map information obtaining unit, 44, 44b matching determining unit, 45, 45b relative lane determining unit, 46 matching information storage, 441 geometric amount calculating unit, 442 matching section estimating unit, 451 consecutive section determining unit, 452 determining method selecting unit, 453 first determining unit, 454 second determining unit, HV subject moving object, HVb moving object, RV non-subject moving object, RVb moving object, CS server device.

The invention claimed is:

1. A relative position determining apparatus, comprising:
a processor to execute a program; and
a memory to store the program which, when executed by the processor, performs processes of:
obtaining first trajectory information that is a set of first trajectory points indicating positions that a first moving object has passed;
obtaining second trajectory information that is a set of second trajectory points indicating positions that a second moving object has passed;
obtaining map information including lane shape information indicating a shape of each lane using geometric information;
determining whether each of the first trajectory information and the second trajectory information matches the lane shape information;
determining relative lanes of the first moving object and the second moving object, based on a result of the determination,
wherein the determining of whether each of the first trajectory information and the second trajectory information matches the lane shape information includes determining whether a shape of a line connecting the first trajectory points matches the shape of the lane by calculating a differential amount between each of the first trajectory points and the shape of the lane based on latitude and longitude, determining whether a shape of a line connecting the second trajectory points matches the shape of the lane by calculating a differential amount between each of the second trajectory points and the shape of the lane based on latitude and longitude, and evaluating whether the first trajectory information, the second trajectory information, and the lane shape information are accurate; and
controlling the first moving object based on the result of determining relative lanes of the first moving object and the second moving object.

2. The relative position determining apparatus according to claim 1,
wherein first matching information and second matching information are generated based on time series of a geometric differential amount between each of the first trajectory points and the second trajectory points and the lane shape information, the first matching information including a matching section that is a section in which the first trajectory information and the lane shape information match, the second matching information including a matching section that is a section in which the second trajectory information and the lane shape information match.

3. The relative position determining apparatus according to claim 1,
wherein the determining of the relative lanes includes:
a plurality of determining methods for determining the relative lanes of the first moving object and the second moving object;
determining, based on the first matching information and the second matching information, whether a matching section in which the first moving object currently exists and a matching section in which the second moving object currently exists are consecutive; and selecting at least one of the plurality of determining methods, based on a result of the determining whether the matching sections are consecutive.

4. The relative position determining apparatus according to claim 3,
wherein the plurality of determining methods include:
a first determining method for determining the relative lanes of the first moving object and the second moving object, based on the map information; and
a second determining method for determining the relative lanes of the first moving object and the second moving object, only based on the first trajectory information and the second trajectory information,
wherein the selecting includes selecting the first determining method when it is determined that the matching section in which the first moving object currently exists and the matching section in which the second moving object currently exists are consecutive, and selecting the second determining method when it is determined that the matching section in which the first moving object currently exists and the matching section in which the second moving object currently exists are not consecutive.

5. The relative position determining apparatus according to claim 3,
wherein the selecting includes selecting one of the plurality of determining methods, based on a determining method selection table indicating conditions for selecting the one of the plurality of determining methods, and
the determining method selection table includes matching conditions indicating whether the matching section in which the first moving object currently exists and the matching section in which the second moving object currently exists are consecutive, various conditions related to the first moving object and the second moving object other than the matching conditions, and the determining methods uniquely selected based on the matching conditions and the various conditions.

6. The relative position determining apparatus according to claim 3,
wherein the first matching information further includes a first matching type indicating a type of the matching section in which the first trajectory information and the lane shape information match,
the second matching information further includes a second matching type indicating a type of the matching section in which the second trajectory information and the lane shape information match, and
the selecting includes selecting one of the plurality of determining methods, based on the result of the determining whether the matching section in which the first moving object currently exists and the matching section in which the second moving object currently exists are consecutive, the first matching type, and the second matching type.

7. The relative position determining apparatus according to claim 2, further comprising
a matching information storage in which the first matching information and the second matching information that are generated are stored,
wherein the determining of whether each of the first trajectory information and the second trajectory information matches the lane shape information includes determining a section in which the map information is accurate, based on the first matching information and the second matching information in the past that are stored in the matching information storage, and estimating, as a mismatch section, a section in which the map information is accurate but the lane shape information and each of the first trajectory information and the second trajectory information do not match, and
the determining of the relative lanes of the first moving object and the second moving object includes correcting the first trajectory information and the second trajectory information included in the mismatch section, using the lane shape information, and determining the relative lanes of the first moving object and the second moving object, based on the first trajectory information and the second trajectory information that are corrected.

8. A relative position determining method, comprising:
obtaining first trajectory information that is a set of first trajectory points indicating positions that a first moving object has passed;
obtaining second trajectory information that is a set of second trajectory points indicating positions that a second moving object has passed;
obtaining map information including lane shape information indicating a shape of each lane using geometric information;
determining whether each of the first trajectory information and the second trajectory information matches the lane shape information;
determining relative lanes of the first moving object and the second moving object, based on a result of the determining;
determining whether a shape of a line connecting the first trajectory points matches the shape of the lane by calculating a differential amount between each of the first trajectory points and the shape of the lane based on latitude and longitude;
determining whether a shape of a line connecting the second trajectory points matches the shape of the lane by calculating a differential amount between each of the second trajectory points and the shape of the lane based on latitude and longitude;
evaluating whether the first trajectory information, the second trajectory information, and the lane shape info ration are accurate; and
controlling the first moving object based on the result of determining relative lanes of the first moving object and the second moving object.

9. A non-transitory computer readable recording medium in which a relative position determining program for causing a computer to function as a relative position determining apparatus is stored, the program causing the computer to execute steps of:
(a) obtaining first trajectory information that is a set of first trajectory points indicating positions that a first moving object has passed;
(b) obtaining second trajectory information that is a set of second trajectory points indicating positions that a second moving object has passed;
(c) obtaining map information including lane shape information indicating a shape of each lane using geometric information;
(d) determining whether each of the first trajectory information and the second trajectory information matches the lane shape information; and
(e) determining relative lanes of the first moving object and the second moving object, based on a result of the determining in step (d),
wherein step (d) includes:

determining whether a shape of a line connecting the first trajectory points matches the shape of the lane by calculating a differential amount between each of the first trajectory points and the shape of the lane based on latitude and longitude;

determining whether a shape of a line connecting the second trajectory points matches the shape of the lane by calculating a differential amount between each of the second trajectory points and the shape of the lane based on latitude and longitude;

evaluating whether the first trajectory information, the second trajectory information, and the lane shape information are accurate; and controlling the first moving object based on the result of determining relative lanes of the first moving object and the second moving object.

\* \* \* \* \*